United States Patent
Zhou et al.

(10) Patent No.: US 11,010,277 B2
(45) Date of Patent: May 18, 2021

(54) METHOD AND DEVICE FOR REALIZING SNAPSHOT FUNCTION OF MICRO-ENGINE PROCESSING PACKET INTERMEDIATE DATA

(71) Applicant: Sanechips Technology Co., Ltd., Guangdong (CN)

(72) Inventors: Feng Zhou, Shenzhen (CN); Kang An, Shenzhen (CN); Zhizhong Wang, Shenzhen (CN); Hengqi Liu, Shenzhen (CN)

(73) Assignee: Sanechips Technology Co., Ltd., Guangdong (CN)

( * ) Notice: Subject to any disclaimer, the term of this patent is extended or adjusted under 35 U.S.C. 154(b) by 127 days.

(21) Appl. No.: 15/738,817

(22) PCT Filed: May 10, 2016

(86) PCT No.: PCT/CN2016/081616
§ 371 (c)(1),
(2) Date: Dec. 21, 2017

(87) PCT Pub. No.: WO2016/206489
PCT Pub. Date: Dec. 29, 2016

(65) Prior Publication Data
US 2018/0181481 A1    Jun. 28, 2018

(30) Foreign Application Priority Data
Jun. 25, 2015    (CN) .......................... 201510359912.2

(51) Int. Cl.
*G06F 11/36*    (2006.01)
(52) U.S. Cl.
CPC ................................ *G06F 11/364* (2013.01)

(58) Field of Classification Search
CPC ..................................................... G06F 11/364
(Continued)

(56) References Cited

U.S. PATENT DOCUMENTS 5,754,759 A * 5/1998 Clarke ................ G06F 11/3466
714/37
5,835,953 A * 11/1998 Ohran ................. G06F 11/1451
711/162
(Continued)

FOREIGN PATENT DOCUMENTS

CN    1851668 A  *  10/2006
CN    1851668 A     10/2006
(Continued)

OTHER PUBLICATIONS

International Search Report in international application No. PCT/CN2016/081616, dated Aug. 19, 2016, 2 pgs.
(Continued)

*Primary Examiner* — Matthew M Kim
*Assistant Examiner* — Indranil Chowdhury
(74) *Attorney, Agent, or Firm* — Cooper Legal Group, LLC

(57) ABSTRACT

A method and device for realizing a snapshot function of a micro-engine processing packet intermediate data, and a computer storage medium. The method comprises: completing a snapshot of packet intermediate data via a debugging instruction to obtain packet snapshot data; completing the storage and outputting of the packet snapshot data according to a software command, so as to move and store the packet snapshot data in an external memory outside the micro-engine; and completing the bus-out of the packet snapshot data in the external memory.

15 Claims, 8 Drawing Sheets

(58) Field of Classification Search
USPC .......................................................... 714/38.1
See application file for complete search history.

(56) References Cited

U.S. PATENT DOCUMENTS

| | | | | |
|---|---|---|---|---|
| 5,964,893 | A * | 10/1999 | Circello | G06F 11/3648 |
| | | | | 714/39 |
| 6,779,145 | B1 | 8/2004 | Edwards | |
| 7,284,153 | B2 * | 10/2007 | Okbay | G06F 11/3636 |
| | | | | 714/30 |
| 2011/0119450 | A1 | 5/2011 | Choi | |
| 2013/0124934 | A1 * | 5/2013 | Jones | G01R 31/318547 |
| | | | | 714/727 |
| 2018/0300219 | A1 * | 10/2018 | Mayer | G06F 11/3656 |

FOREIGN PATENT DOCUMENTS

| | | | |
|---|---|---|---|
| CN | 101930416 A | 12/2010 | |
| CN | 102830953 A | 12/2012 | |
| CN | 102855213 A | 1/2013 | |
| CN | 103793325 A | 5/2014 | |
| CN | 104484354 A | 4/2015 | |
| JP | 2005070951 A | 3/2005 | |
| KR | 20080044652 A | 5/2008 | |
| WO | WO-2013048528 A1 * | 4/2013 | ......... G01R 31/3177 |

OTHER PUBLICATIONS

English Translation of Written Opinion of the International Search Authority in international application No. PCT/CN2016/081616, dated Aug. 19, 2016, 6 pgs.

* cited by examiner

METHOD AND DEVICE FOR REALIZING SNAPSHOT FUNCTION OF MICRO-ENGINE PROCESSING PACKET INTERMEDIATE DATA

TECHNICAL FIELD

The disclosure relates to network processor technologies and in particular to a method and device for realizing a snapshot of packet intermediate data via a Micro Engine (ME), and a computer storage medium.

BACKGROUND

In order to meet the requirement for future network development, the performance of a router needs to be improved, and many technological changes are performed on a core router at the key position of Internet. Especially in a high-end router market, a network processor has become an irreplaceable part of a routing forwarding engine due to outstanding message processing performance and programmability thereof.

In a network processor system, an ME is a core component of the network processor, taking charge of parsing and processing a packet according to microcode instructions. Because the microcode instructions are written by a user according to the requirement, and an error may exist therein, the microcode instructions are required to be effectively verified, a debugging technology for the ME is then widely applied to software fault location, software code analysis and a reverse engineering field, being critical to design and use of the processor.

Debugging the software and microcode generally includes the following three aspects: a breakpoint is set in the microcode, so that a program is interrupted and stops being executed when being executed to the break point; the user can check whether packet intermediate data is correct; a single-step operation is performed on the program, or the program is enabled to exit an interrupt state and continue to be executed, and the packet intermediate data is checked until the program ends. The technology for realizing a snapshot of packet intermediate data via the ME is very important, and is the key of debugging technology.

In a prior art, in sequence to realize a snapshot of packet intermediate data via ME, the main solution is as follows, data is directly read over a bus of the ME, in which the ME is required to retain a read port for an external bus; when being executed to the breakpoint, the instruction is interrupted and stops being executed; the user reads data in a packet memory (PKT_RAM) over the bus, and checks packet intermediate data.

With the above solution, although the structure is simple, two obvious disadvantages exist: 1) for a network processor with a multi-ME parallel structure, the retaining the read port for the external bus of the ME is not good for timing closure and backend wiring of a chip, and the increasing of the dominant frequency of the ME is significantly limited; and 2) an extra read port is required for the PKT_RAM to be used for the bus, which increases the area of the PKT_RAM and the complexity of read logic of the PKT_RAM, and is not good for timing closure.

SUMMARY

In view of this, the disclosure is intended to provide a method and device for realizing a snapshot of packet intermediate data via an ME, and a computer storage medium, which at least solves the problem in the prior art; the disclosure is simple to be realized, and can not only increase a frequency of the chip, but also save an area of the chip.

The embodiments of the disclosure are implemented as follows.

The disclosure provides a method for realizing packet intermediate data via an ME, which includes that:

a snapshot of packet intermediate data is performed, through executing debugging instructions, to obtain packet snapshot data; and the packet snapshot data is stored and output according to a software command, so as to move and store the packet snapshot data in an external memory, in which bus-out of the packet snapshot data is completed, outside the ME.

In the above solution, the debugging instructions are instructions stored in an instruction memory for downloading and storage.

In the above solution, the operation that the snapshot of the packet intermediate data is performed, through executing the debugging instructions, to obtain the packet snapshot data further includes that:

the debugging instructions are executed, the packet intermediate data stored in a packet memory is extracted, and the packet intermediate data is moved to a snapshot cache of the ME for segmented storage, wherein the packet intermediate data comprises N segments of data, which are stored at a number N of addresses.

In the above solution, the operation that the snapshot of the packet intermediate data is preformed, through debugging instructions, to obtain the packet snapshot data further includes that:

a software driver issues a command to the ME to make the ME enter a debugging mode, starting, by a pipeline, to execute the debugging instructions, wherein execution of each debugging instruction results in transfer of a part of the packet intermediate data; and the packet intermediate data is moved from the first address to the last address so as to complete the snapshot of the packet intermediate data, wherein the packet intermediate data is moved and stored from the packet memory to a snapshot cache of the ME.

In the above embodiment, the method further includes that:

the pipeline executes a first debugging instruction instr0, so as to download a segment of the packet intermediate data from the first address of the packet memory and store the downloaded segment of the packet intermediate data to an address 0 of the snapshot cache;

then, the pipeline execute a second debugging instruction instr1 different from the first debugging instruction instr0, so as to download a segment of the packet intermediate data from the second address of the packet memory and store the downloaded segment of the packet intermediate data in an address 1 of the snapshot cache; and by analogy, an (N−1)-th debugging instruction is executed, so as to move and temporarily store completely the packet intermediate data from the packet memory to the snapshot cache.

In the above solution, the operation that the packet snapshot data is stored and output according to the software command further includes that:

after the ME enters a snapshot external transmission mode, the segments of the packet snapshot data in the snapshot cache of the ME are read from the first address to the last address; wherein the packet snapshot data is data obtained after the packet intermediate data is completely moved and thus the snapshot is completed;

the segments of the packet snapshot data are transmitted to the external memory; after receiving the segments of the packet snapshot data, the external memory reports a completion signal to the software driver, wherein the completion signal indicates that transfer of the packet snapshot data is completed; and after receiving the completion signal, the software driver reads the packet snapshot data from the external memory so as to complete output of the whole snapshot.

In the above solution, the operation that after the ME enters the snapshot external transmission mode, the segments of the packet snapshot data in the snapshot cache of the ME are read from the first address to the last address further includes that:

after the ME enters the snapshot external transmission mode, a packet scheduling module reads the segments of the packet snapshot data in sequence from an address 0 to an address N−1; and after each segment of the packet snapshot data is read out, the packet scheduling module correspondingly adds address information to the segment of the packet snapshot data according to a read-out sequence, and stores the segments of the packet snapshot data in the external memory successively.

In the above embodiment, the software command comprises at least one snapshot read command issued to the ME by the software driver;

the snapshot read command includes a read command and read address information for the external memory;

each snapshot read command corresponds to one storage address of the external memory, and corresponds to one snapshot data segment; and the packet snapshot data has a fixed length and comprises N segments, and the packet snapshot data is completely read out by N-times reading of the software driver.

The disclosure also provides a device for realizing a snapshot of packet intermediate data via a micro engine, which includes: the ME, a software driver, and an external memory;

wherein the ME is configured to perform, through debugging instructions, a snapshot of packet intermediate data to obtain packet snapshot data, and store, according to a software command issued by the software driver, the packet snapshot data in the external memory for output;

wherein the software driver is configured to issue a software command to the ME; and wherein the external memory is configured to store the packet snapshot data and complete bus-out of the packet snapshot data.

In the above solution, the debugging instructions are instructions stored in an instruction memory for downloading and storage of the debugging instructions.

In the above solution, the device further includes: a packet memory, which is configured to store the packet intermediate data; and the ME further comprises a snapshot cache, which is configured to, after executing the debugging instructions and extracting the packet intermediate data stored in the packet memory, store the packet intermediate data moved from the packet memory in segments, wherein the packet intermediate data comprises N segments of data, which are stored at a number N of addresses.

In the above solution, the device further includes: a packet memory, which is configured to store the packet intermediate data;

the ME further includes: a pipeline and a snapshot cache;

wherein the pipeline is configured to, after the software driver issues a command to the ME to make the ME enter a debugging mode, start to execute the debugging instructions, wherein execution of each debugging instruction results in transfer of a part of the packet intermediate data; and wherein the snapshot cache is configured to, after the ME executes the debugging instructions and extracts the packet intermediate data stored in the packet memory, store the packet intermediate data moved from the packet memory, and move the packet intermediate data from the first address to the last address so as to complete the snapshot of the packet intermediate data.

In the above solution, the pipeline is further configured to, execute a first debugging instruction instr0, so as to download a segment of the packet intermediate data from the first address of the packet memory and store the downloaded segment of the packet intermediate data in an address 0 of the snapshot cache;

then, execute a second debugging instruction instr1 different from the first debugging instruction instr0, so as to download a segment of the packet intermediate data from the second address in the packet memory and store the downloaded segment of the packet intermediate data in an address 1 of the snapshot cache; and by analogy, execute an (N−1)-th debugging instruction, so as to move and temporarily store completely the packet intermediate data from the packet memory to the packet intermediate data in the snapshot cache.

In the above solution, the ME further includes: a snapshot cache, which is configured to, after the ME executes the debugging instructions and extracts the packet intermediate data stored in the packet memory, store the packet intermediate data moved from the packet memory;

the ME is further configured to, after entering a snapshot external transmission mode, read the segments of the packet snapshot data in the snapshot cache of the ME from the first address to the last address; wherein after the packet intermediate data is completely moved and thus the snapshot is completed, the packet snapshot data is data obtained after the packet intermediate data is completely moved and thus the snapshot is completed;

the external memory is further configured to, after receiving the segments of the packet snapshot data, report a completion signal to the software driver, wherein the completion signal indicates that transfer of the packet snapshot data is completed; and the software driver is further configured to, after receiving the completion signal, read the packet snapshot data from the external memory so as to complete output of the whole snapshot.

In the above solution, the ME further includes a packet scheduling module, which is configured to, after the ME enters the snapshot external transmission mode, read the segments of the packet snapshot data in sequence from an address 0 to an address N−1, and after each segment of the packet snapshot data is read out, correspondingly add address information to the segment of the packet snapshot data according to a read-out sequence, and store the segments of the packet snapshot data in the external memory successively.

In the above solution, the software command comprises at least one snapshot read command issued to the ME by the software driver;

the snapshot read command comprises: a read command and read address information for the external memory;

each snapshot read command corresponds to one storage address of the external memory, and corresponds to one snapshot data segment; and the packet snapshot data has a fixed length and comprises N segments, and the packet snapshot data is completely read out by N-times reading of the software driver.

The disclosure also provides a computer storage medium stored therein computer-executable instructions that, when executed by a processor, cause the processor to execute a method for realizing a snapshot of packet intermediate data via an ME.

The method for realizing a snapshot of packet intermediate data via a micro engine provided in the disclosure includes that: the snapshot of the packet intermediate data is performed, through the debugging instructions, to obtain the packet snapshot data; the packet snapshot data is stored and output according to the software command, so as to store the packet snapshot data in the external memory outside the ME, such that the packet snapshot data in the external memory is output via a bus.

By using the disclosure, firstly, the snapshot of the packet intermediate data is performed via the debugging instructions instead of reading data in a PKT-RAM directly over an external bus, so that the complexity of wiring at the backend of a network processor with a multi-core structure is reduced and the dominant frequency of the ME is increased; moreover, the snapshot data is externally stored and output according to the command issued by the software driver, thus the snapshot data can be moved and stored in the memory outside ME, thereby avoiding providing an extra read port to the PKT-RAM in the ME, and thus saving the area of the PKT-RAM.

DETAILED DESCRIPTION

Figure 1:
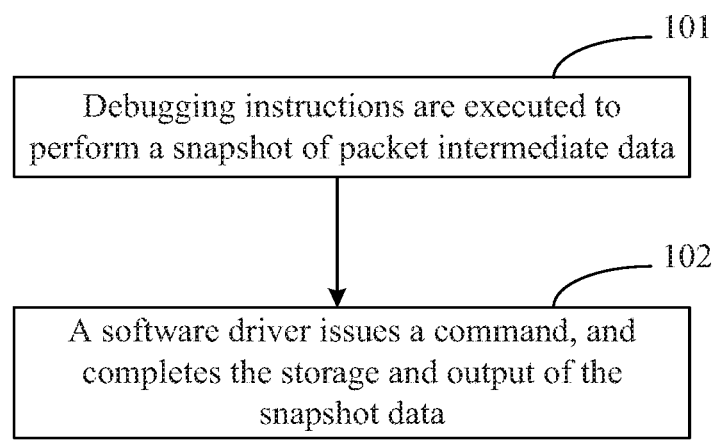
FIG. 1 is a flowchart of a method for realizing a snapshot of packet intermediate data according to an embodiment of the disclosure.

The implementation of embodiments is further elaborated below in combination with the accompanying drawings.

A method for processing a snapshot of packet intermediate data via an ME is provided in an embodiment of the disclosure, which includes the following steps.

In step S11, a snapshot of packet intermediate data is performed via debugging instructions to obtain packet snapshot data.

In step S12, the packet snapshot data is stored and output according to a software command, so as to move and store the packet snapshot data in an external memory, in which bus-out of the packet snapshot data is completed, outside the ME.

In an embodiment of the disclosure, the debugging instructions are instructions stored in an instruction memory for downloading and storage of the debugging instructions.

In an embodiment of the disclosure, the operation that the snapshot of the packet intermediate data is performed, through the debugging instructions, to obtain the packet snapshot data further includes that:

the debugging instructions are executed, the packet intermediate data stored in a packet memory is extracted, and the packet intermediate data is moved to a snapshot cache of the ME for segmented storage, where the packet intermediate data comprises N segments of data, which are stored at a number N of addresses.

In an embodiment of the disclosure, the operation that the snapshot of the packet intermediate data is preformed, through debugging instructions, to obtain the packet snapshot data further includes that:

a software driver issues a command to the ME to make the ME enter a debugging mode, starting, by a pipeline, to execute the debugging instructions, where execution of each debugging instruction results in transfer of a part of the packet intermediate data; and the packet intermediate data is moved from the first address to the last address so as to complete the snapshot of the packet intermediate data, where the packet intermediate data is moved and stored from the packet memory to a snapshot cache of the ME.

In an embodiment of the disclosure, the method further includes that:

the pipeline executes a first debugging instruction instr0, so as to download a segment of the packet intermediate data from the first address of the packet memory and store the downloaded segment of the packet intermediate data to an address 0 of the snapshot cache;

then, the pipeline execute a second debugging instruction instr1 different from the first debugging instruction instr0, so as to download a segment of the packet intermediate data from the second address of the packet memory and store the downloaded segment of the packet intermediate data in an address 1 of the snapshot cache; and by analogy, an (N−1)-th debugging instruction is executed, so as to move and temporarily store completely the packet intermediate data from the packet memory to the snapshot cache.

In an embodiment of the disclosure, the operation that the packet snapshot data is stored and output according to the software command further includes that:

after the ME enters a snapshot external transmission mode, the segments of the packet snapshot data in the snapshot cache of the ME are read from the first address to the last address; where the packet snapshot data is data obtained after the packet intermediate data is completely moved and thus the snapshot is completed;

the segments of the packet snapshot data are transmitted to the external memory; after receiving the segments of the packet snapshot data, the external memory reports a completion signal to the software driver, where the completion signal indicates that transfer of the packet snapshot data is completed; and after receiving the completion signal, the software driver reads the packet snapshot data from the external memory so as to complete output of the whole snapshot.

In an embodiment of the disclosure, the operation that after the ME enters the snapshot external transmission mode, the segments of the packet snapshot data in the snapshot cache of the ME are read from the first address to the last address further includes that:

after the ME enters the snapshot external transmission mode, a packet scheduling module reads the segments of the packet snapshot data in sequence from an address 0 to an address N−1; and after each segment of the packet snapshot data is read out, the packet scheduling module correspondingly adds address information to the segment of the packet snapshot data according to a read-out sequence, and stores the segments of the packet snapshot data in the external memory successively.

In an embodiment of the disclosure, the software command comprises at least one snapshot read command issued to the ME by the software driver;

the snapshot read command includes a read command and read address information for the external memory;

each snapshot read command corresponds to one storage address of the external memory, and corresponds to one snapshot data segment; and the packet snapshot data has a fixed length and comprises N segments, and the packet snapshot data is completely read out by N-times reading of the software driver.

A device for realizing a snapshot of packet intermediate data via an ME provided in an embodiment of the disclosure includes: the ME, a software driver, and an external memory; in which, the ME is configured to perform, through debugging instructions, a snapshot of packet intermediate data to obtain packet snapshot data, and store, according to a software command issued by the software driver, the packet snapshot data in the external memory for output;

the software driver is configured to issue a software command to the ME; and the external memory is configured to store the packet snapshot data and complete bus-out of the packet snapshot data.

In an embodiment of the disclosure, the debugging instructions are instructions stored in an instruction memory for downloading and storage of the debugging instructions.

In an embodiment of the disclosure, the device further includes: a packet memory, which is configured to store the packet intermediate data;

the ME further comprises a snapshot cache, which is configured to, after executing the debugging instructions and extracting the packet intermediate data stored in the packet memory, store the packet intermediate data moved from the packet memory in segments, where the packet intermediate data comprises N segments of data, which are stored at a number N of addresses.

In an embodiment of the disclosure, the device further includes: a packet memory, which is configured to store the packet intermediate data;

the ME further includes: a pipeline and a snapshot cache; in which, the pipeline is configured to, after the software driver issues a command to the ME to make the ME enter a debugging mode, start to execute the debugging instructions, where execution of each debugging instruction results in transfer of a part of the packet intermediate data; and the snapshot cache is configured to, after the ME executes the debugging instructions and extracts the packet intermediate data stored in the packet memory, store the packet intermediate data moved from the packet memory, and move the packet intermediate data from the first address to the last address so as to complete the snapshot of the packet intermediate data.

In an embodiment of the disclosure, the pipeline is further configured to, execute a first debugging instruction instr0, so as to download a segment of the packet intermediate data from the first address of the packet memory and store the downloaded segment of the packet intermediate data in an address 0 of the snapshot cache;

then, execute a second debugging instruction instr1 different from the first debugging instruction instr0, so as to download a segment of the packet intermediate data from the second address in the packet memory and store the downloaded segment of the packet intermediate data in an address 1 of the snapshot cache; and by analogy, execute an (N−1)-th debugging instruction, so as to move and temporarily store completely the packet intermediate data from the packet memory to the packet intermediate data in the snapshot cache.

In an embodiment of the disclosure, the ME further includes: a snapshot cache, which is configured to, after the ME executes the debugging instructions and extracts the packet intermediate data stored in the packet memory, store the packet intermediate data moved from the packet memory;

the ME is further configured to, after entering a snapshot external transmission mode, read the segments of the packet snapshot data in the snapshot cache of the ME from the first address to the last address; where after the packet intermediate data is completely moved and thus the snapshot is completed, the packet snapshot data is data obtained after the packet intermediate data is completely moved and thus the snapshot is completed;

the external memory is further configured to, after receiving the segments of the packet snapshot data, report a completion signal to the software driver, where the completion signal indicates that transfer of the packet snapshot data is completed; and the software driver is further configured to, after receiving the completion signal, read the packet snapshot data from the external memory so as to complete output of the whole snapshot.

In an embodiment of the disclosure, the ME further includes a packet scheduling module, which is configured to, after the ME enters the snapshot external transmission mode, read the segments of the packet snapshot data in sequence from an address 0 to an address N−1, and after each segment of the packet snapshot data is read out, correspondingly add address information to the segment of the packet snapshot data according to a read-out sequence, and store the segments of the packet snapshot data in the external memory successively.

In an embodiment of the disclosure, the software command comprises at least one snapshot read command issued to the ME by the software driver;

the snapshot read command comprises: a read command and read address information for the external memory;

each snapshot read command corresponds to one storage address of the external memory, and corresponds to one snapshot data segment; and the packet snapshot data has a fixed length and comprises N segments, and the packet snapshot data is completely read out by N-times reading of the software driver.

The disclosure is elaborated below by taking a practical application scenario for example:

a specific application scenario of the method for realizing a snapshot of packet intermediate data via an ME provided by the disclosure can be that: the packet intermediate data is stored in the packet memory, and the packet intermediate data is obtained, through debugging instructions, to perform a snapshot of the packet intermediate data, so as to obtain the packet snapshot data; the snapshot data is stored and output according to the command issued by the software driver, so that the snapshot data can be moved and stored in the external memory outside the ME; the external memory serves as the total memory for storing the snapshot data, and the snapshot data is output from the external memory via a bus, thereby avoiding the problems in the prior art that the chip frequency downshifts and the chip design is complex due to an extra read port for external bus of the packet memory in the ME.

In the application scenario, by using the disclosure, firstly, the snapshot of the packet intermediate data is performed through debugging instructions instead of reading the packet intermediate data stored in the packet memory directly over the external bus, so that the complexity of wiring at the backend of the network processor with a multi-core structure is reduced and the dominant frequency of the ME is increased; moreover, the snapshot data is externally stored and output according to the command issued by the software driver, thus the snapshot data can be moved and stored in the memory outside ME, thereby avoiding providing the extra read port to the packet memory in the ME, and thus saving the area of the chip.

Figure 2:
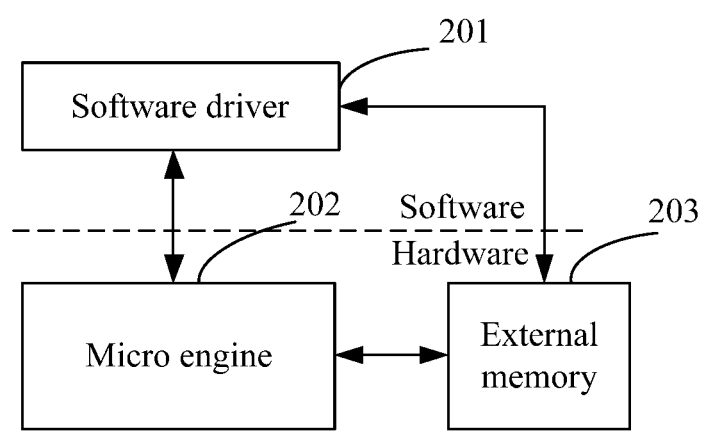
FIG. 2 is a structure diagram of a device for realizing a snapshot of packet intermediate data according to an embodiment of the disclosure.

FIG. 1 is a flowchart of a method for realizing a snapshot of packet intermediate data according to an embodiment of the disclosure, and FIG. 2 is a structure diagram of a device for realizing a snapshot of packet intermediate data according to an embodiment of the disclosure. Based on the structure of the device in FIG. 2, the flow of realizing the snapshot of the packet intermediate data via the ME in FIG. 1 includes the following steps.

In step S101, debugging instructions are executed to perform a snapshot of packet intermediate data.

In a specific embodiment, the debugging instructions include:

downloading and storing instructions stored in an instruction memory. The packet intermediate data can be moved from a packet memory to a snapshot cache of the ME through the instructions.

As shown in FIG. 2, the software driver issues a command to the ME 202, the ME enters a debugging mode, and a pipeline starts to execute the debugging instructions. Execution of each debugging instruction results in transfer of a part of the packet intermediate data. The packet intermediate data is completely moved from the first address to the last address, the snapshot is thus completed, and therefore, the packet intermediate data is stored in the snapshot cache of the ME.

In step S102, the software driver issues a command, and the ME completes the storage and output of the snapshot data.

As shown in FIG. 2, the software driver issues the command to the ME 202, the ME enters the snapshot external transmission mode, and output of the snapshot is completed to the external storage 203.

After the ME enters the snapshot external transmission mode, a hardware reads a packet segment from the snapshot cache in sequence from the first address to the last address, and transmits the packet segment to the external memory; where the packet has a fixed length, so the number of the transmitted message segments is fixed, where the number is set as N. After receiving N packet snapshot segments, the external memory reports a completion signal to the software driver to indicate that the snapshot has been transmitted completely. After receiving the signal, the software driver reads the packet snapshot from the external memory to enable the snapshot to be completely output.

The disclosure is elaborated below based on different specific application examples.

First Application Example

Figure 3:
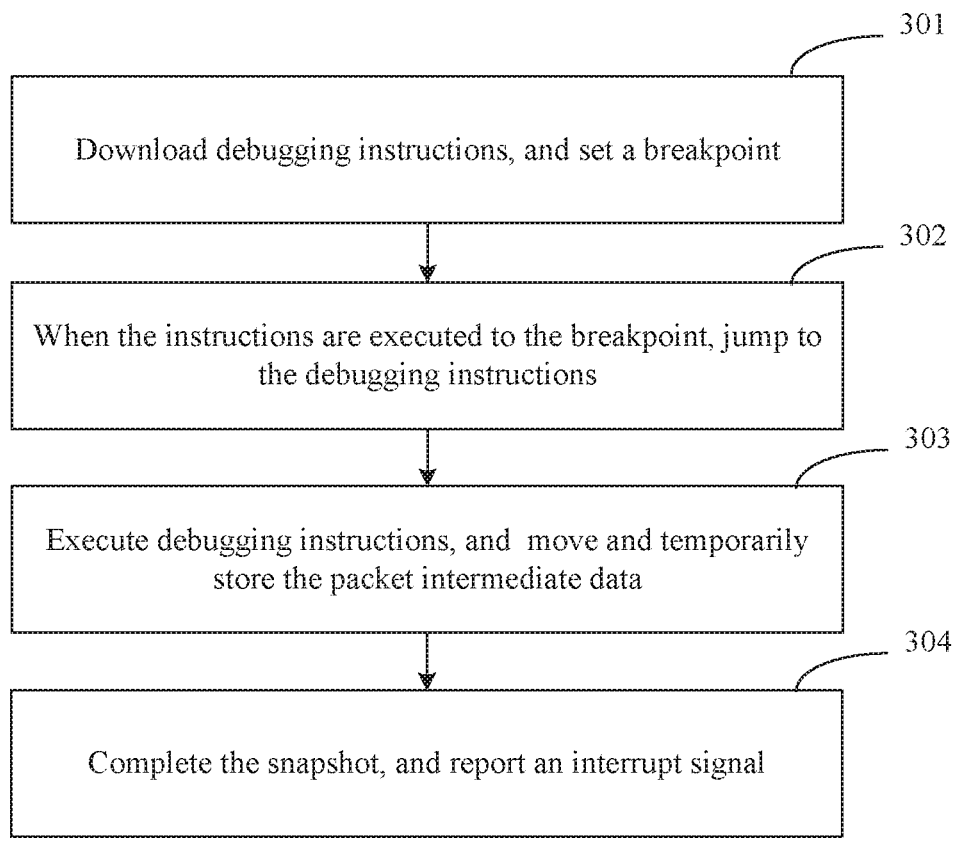
FIG. 3 is a flowchart of a method for realizing a snapshot of packet intermediate data in a first application example applying the embodiment of the disclosure.
Figure 4:
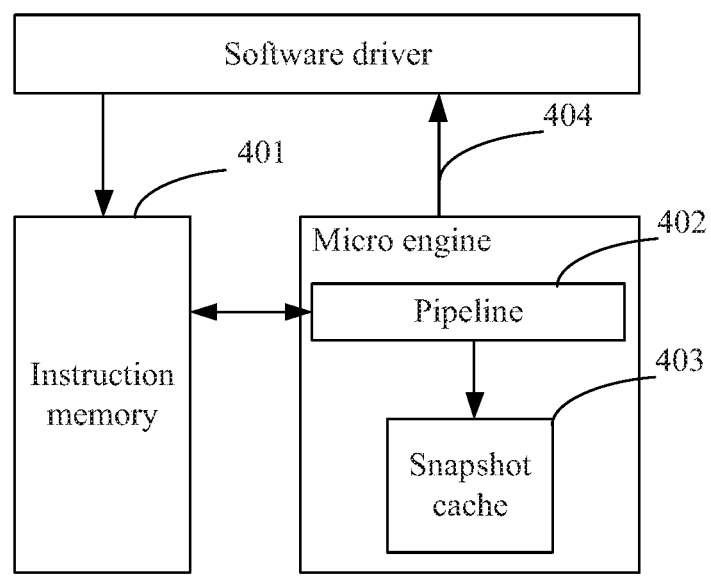
FIG. 4 is a structure diagram of a device for realizing a snapshot of packet intermediate data in a first application example applying the embodiment of the disclosure.

FIG. 3 is a flowchart of a method for realizing a snapshot of packet intermediate data in the first application example applying the embodiment of the disclosure, and FIG. 4 is a structure diagram of a device for realizing a snapshot of packet intermediate data in the first application example applying the embodiment of the disclosure. Based on the structure of the device in FIG. 4, the flow of realizing a snapshot of packet intermediate data via the ME in FIG. 3 includes the following steps.

In step S301, the debugging instructions are downloaded, and a breakpoint is set.

Here, the debugging instructions are downloading and storing instructions stored in the instruction memory. Since the offset first address and the offset last address of the packet intermediate data in the PKT-RAM are fixed, debugging instructions are edited for executing downloading and storing the packet; a downloading address points to the range between the first address and the last address of the packet intermediate data in the PKT-RAM.

As shown in FIG. 4, the software driver downloads in advance the debugging instructions in a special area in the instruction memory 401 via the bus. In the debugging mode, the software driver issues a debugging breakpoint. The instructions are stopped executing when the instructions are executed to the breakpoint.

In step S302, when the instructions are executed to the breakpoint, the instructions jump to the debugging instructions;

when the instructions are executed to the breakpoint, the rest of the instructions will not continue to be executed, but an entry of the debugging instructions of the special instruction are jumped to, which are downloaded in the instruction memory in advance In step S303, the debugging instructions are executed, and the packet intermediate data is moved and temporarily stored.

When an address where instructions are to be executed jumps to the entry of the debugging instructions, the pipeline then starts to execute the debugging instructions. As shown in FIG. 4, the pipeline executes a first debugging instruction to move the packet segment corresponding to the first address of the packet intermediate data, so that the packet segment is moved in the snapshot cache 402. According to the order of addresses, a part of the packet segments is moved when one instruction is executed, and the packet intermediate data is completely moved 403 until the debugging instructions are completely executed.

Figure 5:
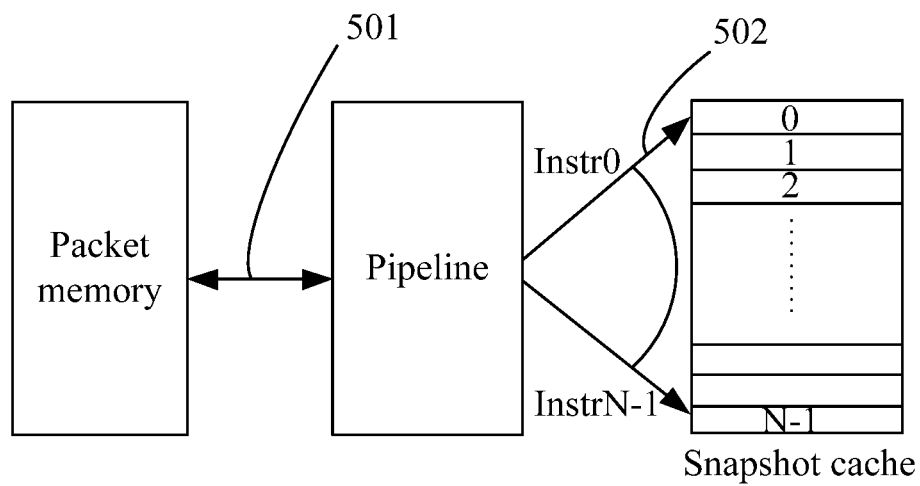
FIG. 5 is a schematic diagram of executing debugging instructions in a first application example applying the embodiment of the disclosure.

Specifically, FIG. 5 is a schematic diagram of executing the debugging instructions in a first application example applying the embodiment of the disclosure; the pipeline executes the first debugging instruction instr0, which is a downloading and storing instruction, such that a segment of the packet intermediate data is downloaded 501 from the first address of the packet memory, and stored 502 in an address 0 of the snapshot cache. The pipeline continues to execute a second debugging instruction instr1, which is also a downloading and storing instruction, such that a segment of the packet intermediate data is downloaded from the second address in the packet memory 501, and stored to in an address 1 of the snapshot cache 502. By analogy, an (N−1)-th debugging instruction is executed completely, such that the packet intermediate data is completely moved and temporarily stored to the snapshot cache.

In step S304, the snapshot is completed, and an interrupt signal is reported.

After the debugging instructions are executed, all the packet intermediate data is stored in the snapshot cache, and the ME reports a snapshot completion signal to the software driver, where the completion signal can be a processor interrupt signal 404.

Second Application Example

Figure 6:
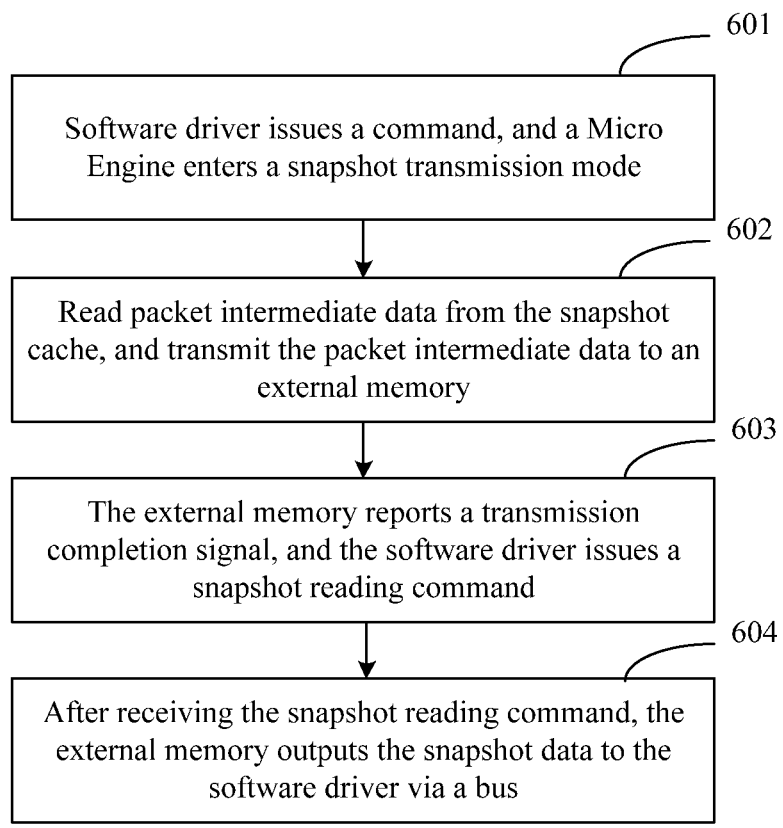
FIG. 6 is a flowchart of external storage and output of packet intermediate data in a second application example applying the embodiment of the disclosure.
Figure 7:
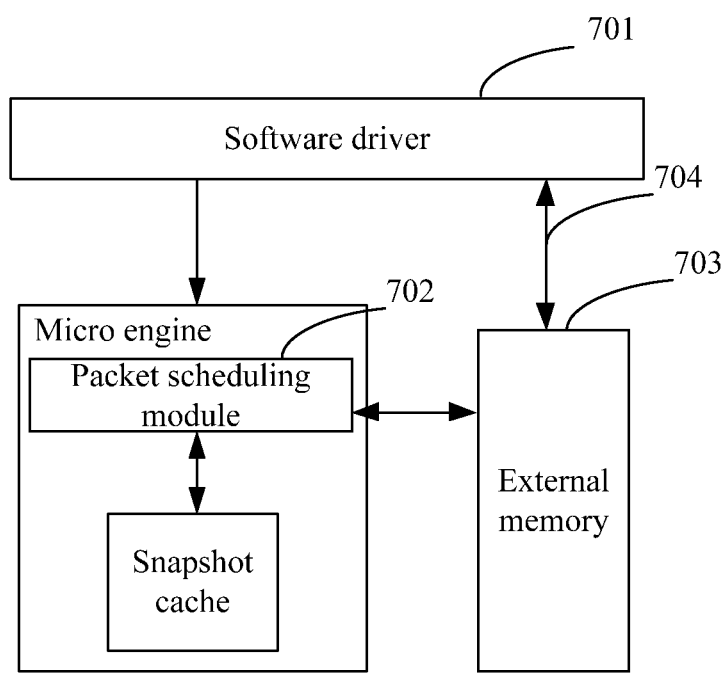
FIG. 7 is a structure diagram of external storage and output of packet intermediate data in a second application example applying the embodiment of the disclosure.

In the example, the packet intermediate data is required to be transmitted to the external memory so as to enable the packet snapshot data to be output. FIG. 6 is a flowchart of external storage and output of the packet intermediate data in the second application example applying the embodiment of the disclosure, and FIG. 7 is a structure diagram of external storage and output of the packet intermediate data in the second application example applying the embodiment of the disclosure. Based on the structure of the device in FIG. 7, the flow of external storage and output of the packet intermediate data in FIG. 6 includes the following steps.

In step S601, the software driver issues a command, and the ME enters a snapshot external transmission mode.

As shown in FIG. 7, the software driver issues the command to the ME via a bus, and the ME triggers an internal packet scheduling module therein to enter the snapshot external transmission mode 701.

In step S602, the packet intermediate data is read from the snapshot cache, and transmitted to the external memory;

As shown in FIG. 7, the packet scheduling module in the ME reads a packet segment from the snapshot cache from the first address to the last address, and transmits the packet segment to the external memory 702.

Figure 8:
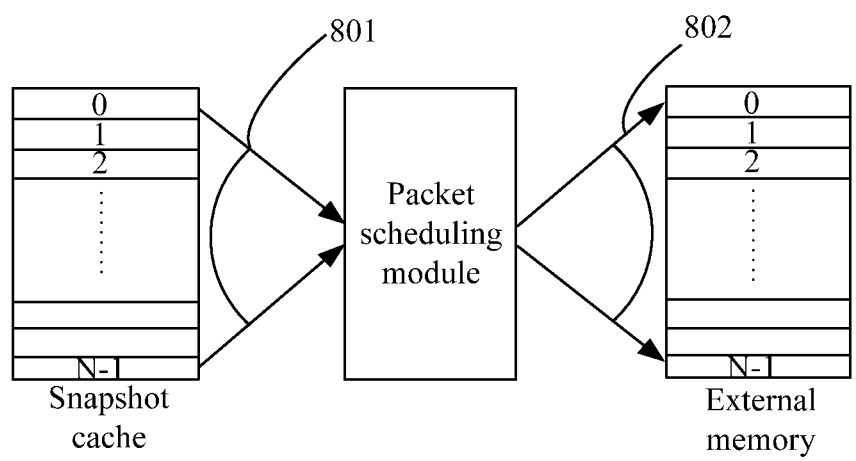
FIG. 8 is a schematic diagram of working of a packet scheduling module in a second application example applying the embodiment of the disclosure.

Specifically, FIG. 8 is a schematic diagram of an operation of the packet scheduling module in the second application example applying the embodiment of the disclosure; the snapshot data is stored in the snapshot cache of the ME with segments, where N segments of data is stored in N addresses.

After the ME enters the snapshot external transmission mode, the packet scheduling module reads 801 the segments of the packet snapshot data in sequence from the address 0 to the address N−1.

After each packet segment is read out, the packet scheduling module correspondingly adds the address information to the segment of the packet snapshot data according to a read-out sequence, and stores 802 each snapshot segment in the external memory successively.

In step S603, the external memory reports a transmission completion signal, and the software driver issues a snapshot reading command.

As shown in FIG. 8, the snapshot data has a fixed length, so the number of the transmitted message segments is fixed, where the number is set as N. After receiving N packet snapshot segments, the external memory reports a completion signal to the software driver to indicate that the snapshot has been transmitted completely 703. After receiving the signal, the software driver issues a snapshot reading command 704.

In step S604, after receiving the snapshot reading command, the external memory outputs the snapshot data to the software driver via a bus.

Due to the large amount of the snapshot data and limited bit width of the bus, the software driver will issue multiple snapshot reading commands, where the snapshot reading command each contain a read command and read address information of the external memory, where each command corresponds to one storage address of the external memory, and corresponds to a snapshot data segment. The snapshot data has a fixed length and comprises N segments, the packet snapshot data is completely read out after N-times reading, thus, the snapshot is output completely.

According to the method for realizing a snapshot of packet intermediate data via an ME in the embodiments of the disclosure, the snapshot of the packet intermediate data is performed through executing debugging instructions, and the snapshot data is stored and output completed according to the command issued by the software driver. In the embodiments of the disclosure, firstly, the snapshot of the packet intermediate data is performed through executing debugging instructions instead of reading data in PKT-RAM directly over the external bus, so that the complexity of wiring at the backend of the network processor with a multi-core structure is reduced and the dominant frequency of the ME is increased; moreover, the snapshot data is externally stored and output according to the command issued by the software driver, thus the snapshot data can be moved and stored in the memory outside ME, thereby avoiding providing the extra read port to the PKT-RAM in the ME, and thus saving the chip area of the PKT-RAM. The method is simple and easy to be implemented.

The above units can be realized by a Central Processing Unit (CPU), or a Digital Signal Processor (DSP), or a Field Programmable Gate Array (FPGA) in an electronic device.

If the integrated modules of the disclosure are implemented in the form of software function modules and sold or used as independent products, they can also be stored in a computer readable storage medium. Based on such an understanding, the technical solution of the embodiment of the disclosure substantially or a part with contributions to the prior art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The storage medium includes: various media capable of storing program codes such as a U disk, a mobile hard disk, a Read-Only Memory (ROM), a Random Access Memory (RAM), a magnetic disk or a compact disc. Therefore, the embodiment of the disclosure is not limited to any specific hardware and software combination.

The disclosure further provides a computer storage medium stored therein computer-executable instructions that, when executed by a processor, cause the processor to execute a method for realizing a snapshot of packet intermediate data via an ME.

The above is only the preferred embodiments of the disclosure and not intended to limit the scope of protection of the disclosure.

INDUSTRIAL APPLICABILITY

By using the disclosure, firstly the snapshot of the packet intermediate data is performed via the debugging instructions instead of reading data in a PKT-RAM directly over the external bus, so that the complexity of wiring at the backend of the network processor with a multi-core structure is reduced and the dominant frequency of the ME is increased; moreover, the snapshot data is externally stored and output according to the command issued by the software driver, thus the snapshot data can be moved and stored in the memory outside ME, thereby avoiding providing the extra read port to the PKT-RAM in the ME, and thus saving the chip area of the PKT-RAM.

The invention claimed is:

1. A method for realizing a snapshot of packet intermediate data via a micro engine (ME), comprising:
    performing, through debugging instructions, a snapshot of packet intermediate data to obtain packet snapshot data; and
    storing and outputting the packet snapshot data according to a software command, so as to move and store the packet snapshot data to an external memory outside the ME, enabling bus-out of the packet snapshot data through the external memory,
    wherein the storing and outputting the packet snapshot data according to the software command further comprises:
        after the ME enters a snapshot external transmission mode, reading segments of the packet snapshot data in a snapshot cache of the ME from a first address to a last address; wherein the packet snapshot data is data obtained after the packet intermediate data is completely moved and thus the snapshot is completed;
        transmitting the segments of the packet snapshot data to the external memory, after receiving the segments of the packet snapshot data, reporting, by the external memory, a completion signal to a software driver, wherein the completion signal indicates that transfer of the packet snapshot data is completed; and
        after receiving the completion signal, reading, by the software driver, the packet snapshot data from the external memory so as to complete output of the whole snapshot; and
    wherein after the ME enters the snapshot external transmission mode, the reading the segments of the packet snapshot data in the snapshot cache of the ME from the first address to the last address further comprises:
        after the ME enters the snapshot external transmission mode, reading, by a packet scheduling module, the segments of the packet snapshot data in sequence from an address 0 to an address N−1; and
        after each segment of the packet snapshot data is read out, correspondingly adding, by the packet scheduling module, address information to the segment of the packet snapshot data according to a read-out sequence, and storing the segments of the packet snapshot data in the external memory successively.

2. The method according to claim 1, wherein the debugging instructions are instructions stored in an instruction memory for downloading and storage.

3. The method according to claim 2, wherein the performing, through the debugging instructions, the snapshot of the packet intermediate data to obtain the packet snapshot data further comprises:
    executing the debugging instructions, extracting the packet intermediate data stored in a packet memory, and moving the packet intermediate data to the snapshot cache of the ME for segmented storage, wherein the packet intermediate data comprises N segments of data, which are stored at a number N of addresses.

4. The method according to claim 2, wherein the performing, through the debugging instructions, the snapshot of the packet intermediate data to obtain the packet snapshot data further comprises:
    issuing, by the software driver, a command to the ME to make the ME enter a debugging mode, starting, by a pipeline, to execute the debugging instructions, wherein execution of each debugging instruction results in transfer of a part of the packet intermediate data; and
    moving the packet intermediate data from a first address of the packet memory to a last address of the packet memory so as to complete the snapshot of the packet intermediate data, wherein the packet intermediate data is moved and stored from a packet memory to the snapshot cache of the ME.

5. The method according to claim 3, further comprising:
    executing, by a pipeline, a first debugging instruction instr0, so as to download a segment of the packet intermediate data from a first address of the packet memory and store the downloaded segment of the packet intermediate data in an address 0 of the snapshot cache;
    then, executing, by the pipeline, a second debugging instruction instr1 different from the first debugging instruction instr0, so as to download one segment of the packet intermediate data from a second address of the packet memory and store the downloaded segment of the packet intermediate data in an address 1 of the snapshot cache; and
    by analogy, executing an (N−1)-th debugging instruction, so as to move and temporarily store completely the packet intermediate data from the packet memory to the snapshot cache.

6. The method according to claim 5, further comprising:
    executing, by the pipeline, a first debugging instruction instr0, so as to download a segment of the packet intermediate data from the first address of the packet memory and store the downloaded segment of the packet intermediate data in an address 0 of the snapshot cache;
    then, executing, by the pipeline, a second debugging instruction instr1 different from the first debugging instruction instr0, so as to download one segment of the packet intermediate data from a second address of the packet memory and store the downloaded segment of the packet intermediate data in an address 1 of the snapshot cache; and
    by analogy, executing an (N−1)-th debugging instruction, so as to move and temporarily store completely the packet intermediate data from the packet memory to the snapshot cache.

7. The method according to claim 1, wherein the software command comprises at least one snapshot read command issued to the ME by the software driver;
    the snapshot read command comprises: a read command and read address information for the external memory;
    each snapshot read command corresponds to one storage address of the external memory, and corresponds to one snapshot data segment; and the packet snapshot data has a fixed length and comprises N segments, and the packet snapshot data is completely read out by N-times reading of the software driver.

8. A device for realizing a snapshot of packet intermediate data via a micro engine (ME), comprising: the ME, a software driver, and an external memory outside the ME;
- wherein the ME is configured to perform, through debugging instructions, a snapshot of packet intermediate data to obtain packet snapshot data, and store, according to a software command issued by the software driver, the packet snapshot data in the external memory for output;
- wherein the software driver is configured to issue the software command to the ME;
- wherein the external memory is configured to store the packet snapshot data and complete bus-out of the packet snapshot data;
- wherein the ME further comprises: a snapshot cache, which is configured to, after the ME executes the debugging instructions and extracts the packet intermediate data stored in a packet memory, store the packet intermediate data moved from the packet memory;
- wherein the ME is further configured to, after entering a snapshot external transmission mode, read segments of the packet snapshot data in the snapshot cache of the ME from a first address to a last address; wherein after the packet intermediate data is completely moved and thus the snapshot is completed, the packet snapshot data is data obtained after the packet intermediate data is completely moved and thus the snapshot is completed;
- wherein the external memory is further configured to, after receiving the segments of the packet snapshot data, report a completion signal to the software driver, wherein the completion signal indicates that transfer of the packet snapshot data is completed;
- wherein the software driver is further configured to, after receiving the completion signal, read the packet snapshot data from the external memory so as to complete output of the whole snapshot; and
- wherein the ME further comprises a packet scheduling module, which is configured to, after the ME enters the snapshot external transmission mode, read the segments of the packet snapshot data in sequence from an address 0 to an address N−1, and after each segment of the packet snapshot data is read out, correspondingly add address information to the segment of the packet snapshot data according to a read-out sequence, and store the segments of the packet snapshot data in the external memory successively.

9. The device according to claim 8, wherein the debugging instructions are instructions stored in an instruction memory for downloading and storage.

10. The device according to claim 9, wherein the snapshot cache is configured to store the packet intermediate data moved from the packet memory in segments, wherein the packet intermediate data comprises N segments of data, which are stored at a number N of addresses.

11. The device according to claim 10, wherein a pipeline is further configured to,
- execute a first debugging instruction instr0, so as to download a segment of the packet intermediate data from a first address of the packet memory and store the downloaded segment of the packet intermediate data in an address 0 of the snapshot cache;
- then, execute a second debugging instruction instr1 different from the first debugging instruction instr0, so as to download a segment of the packet intermediate data from a second address of the packet memory and store the downloaded segment of the packet intermediate data in an address 1 of the snapshot cache; and
- by analogy, execute an (N−1)-th debugging instruction, so as to move and temporarily store completely the packet intermediate data from the packet memory to the packet intermediate data in the snapshot cache.

12. The device according to claim 9,
- wherein the ME further comprises a pipeline;
- wherein the pipeline is configured to, after the software driver issues a command to the ME to make the ME enter a debugging mode, start to execute the debugging instructions, wherein execution of each debugging instruction results in transfer of a part of the packet intermediate data; and
- wherein the snapshot cache is further configured to move the packet intermediate data from a first address of the packet memory to a last address of the packet memory so as to complete the snapshot of the packet intermediate data.

13. The device according to claim 12, wherein the pipeline is further configured to,
- execute a first debugging instruction instr0, so as to download a segment of the packet intermediate data from the first address of the packet memory and store the downloaded segment of the packet intermediate data in an address 0 of the snapshot cache;
- then, execute a second debugging instruction instr1 different from the first debugging instruction instr0, so as to download a segment of the packet intermediate data from a second address of the packet memory and store the downloaded segment of the packet intermediate data in an address 1 of the snapshot cache; and
- by analogy, execute an (N−1)-th debugging instruction, so as to move and temporarily store completely the packet intermediate data from the packet memory to the packet intermediate data in the snapshot cache.

14. The device according to claim 8, wherein the software command comprises at least one snapshot read command issued to the ME by the software driver;
- the snapshot read command comprises: a read command and read address information for the external memory;
- each snapshot read command corresponds to one storage address of the external memory, and corresponds to one snapshot data segment; and
- the packet snapshot data has a fixed length and comprises N segments, and the packet snapshot data is completely read out by N-times reading of the software driver.

15. A non-transitory computer storage medium having stored therein computer-executable instructions that, when executed by a processor, cause the processor to execute a method for realizing a snapshot of packet intermediate data via a micro engine (ME), the method comprising:
- performing, through debugging instructions, a snapshot of packet intermediate data to obtain packet snapshot data; and
- storing and outputting the packet snapshot data according to a software command, so as to move and store the packet snapshot data to an external memory outside the ME, enabling bus-out of the packet snapshot data through the external memory,
- wherein the storing and outputting the packet snapshot data according to the software command further comprises:

after the ME enters a snapshot external transmission mode, reading segments of the packet snapshot data in a snapshot cache of the ME from a first address to a last address; wherein the packet snapshot data is data obtained after the packet intermediate data is completely moved and thus the snapshot is completed;

transmitting the segments of the packet snapshot data to the external memory, after receiving the segments of the packet snapshot data, reporting, by the external memory, a completion signal to a software driver, wherein the completion signal indicates that transfer of the packet snapshot data is completed; and after receiving the completion signal, reading, by the software driver, the packet snapshot data from the external memory so as to complete output of the whole snapshot; and wherein after the ME enters the snapshot external transmission mode, the reading the segments of the packet snapshot data in the snapshot cache of the ME from the first address to the last address further comprises:

after the ME enters the snapshot external transmission mode, reading, by a packet scheduling module, the segments of the packet snapshot data in sequence from an address 0 to an address N−1; and after each segment of the packet snapshot data is read out, correspondingly adding, by the packet scheduling module, address information to the segment of the packet snapshot data according to a read-out sequence, and storing the segments of the packet snapshot data in the external memory successively.

\* \* \* \* \*